United States Patent [19]

Gorges

[11] Patent Number: 4,579,248

[45] Date of Patent: Apr. 1, 1986

[54] ACCESS PANEL ASSEMBLY FOR AIRCRAFT FUEL TANK

[75] Inventor: Frederick J. Gorges, Bellevue, Wash.

[73] Assignee: The Boeing Company, Seattle, Wash.

[21] Appl. No.: 632,794

[22] Filed: Jul. 19, 1984

Related U.S. Application Data

[63] Continuation-in-part of Ser. No. 567,843, Nov. 10, 1983.

[51] Int. Cl.[4] .............................................. B65D 45/00
[52] U.S. Cl. ..................................... 220/327; 220/378
[58] Field of Search ................................ 220/327, 378

[56] References Cited

U.S. PATENT DOCUMENTS

2,249,497  7/1941  Samans ................................. 220/327
2,517,012  8/1950  Miller .................................... 220/327

Primary Examiner—George T. Hall
Attorney, Agent, or Firm—Hughes & Cassidy

[57] ABSTRACT

An improved gasket for a panel assembly to close an access opening for the wall of a wing mounted fuel tank in an aircraft. The gasket comprises a lubricant impregnated wire mesh material, having at its edge portions annular seal members, with the material of the seal members being impregnated in the mesh elements at the edge portions of the wire mesh material. The gasket is positioned between a clamping ring which is in bearing relationship against the panel and an edge portion of the wall of the fuel tank.

22 Claims, 8 Drawing Figures

ACCESS PANEL ASSEMBLY FOR AIRCRAFT FUEL TANK

CROSS REFERENCE TO RELATED APPLICATIONS

This is a continuation-in-part of U.S. patent application Ser. No. 567,843, filed Nov. 10, 1983, entitled "Unitary Access Panel for Aircraft Fuel Tanks."

BACKGROUND OF THE INVENTION

1. Technical Field

The present invention relates to an access panel assembly, and more particularly to such a panel assembly with an improved gasket means particularly adapted for use in conjunction with aircraft wing fuel tanks.

2. Background Art

It is quite common in present day aircraft for fuel tanks to be mounted in the wing of the aircraft. Quite commonly, the bottom side of the fuel tank has a removable access panel that is mounted flush with the lower wing surface. Such access panels are removed periodically for such things as inspection, cleaning the fuel tank, etc.

There are a number of special design considerations associated with such access panels. Obviously, the panel should form a reliable seal to prevent leakage from the fuel tank, and it should be lightweight and of adequate structural strength to be consistant with overall objectives for aircraft design. A further and possibly more subtle consideration is that the wing of the aircraft will deflect upwardly and downwardly under varying aerodynamic loads, and there will accordingly be some flexing of the structural components of the wing. This will in turn affect the design of the attachment of the panel to the wing structure.

Yet another consideration relates to the electrical conductivity of the aircraft structure. Because of the possibility of lightning strikes, it is desirable that metal components of the aircraft have a conductive path to other metallic parts of the aircraft. However, if such components are to be joined one to another so that there is metal to metal contact, there is a possibility of a resultant unwanted wear and possible corrosion.

A common prior art arrangement for such a panel is to have a main panel member with a periperhal edge portion that fits inside the edge portion of the wing structure that defines the access opening. There is a clamp ring which fits against edge portions of the panel and against the wing structural edge portion that defines the opening, and there are a number of fasteners which press the clamp ring into firm engagement with the panel edge portions and the wing structure edge portion. A suitable fuel seal is provided. Also, a metal mesh annular gasket is positioned between the clamp ring and the panel and wing edge portions which are in bearing engagement with the clamp ring. The gasket is commonly impregnated with a grease or other suitable lubricant to alleviate problems of abrasion with regard to the gasket and also the bearing surfaces which come into engagement with the gasket.

While the prior art designs for such panel assemblies have in general been adequate, there is a continued need for design improvement with regard to simplifying and reducing service, requirements, proper containment of lubricant, prevention of corrosion that might result from abrasion or other causes, and other considerations. Accordingly, it is an object of the present invention to provide an improved panel assembly particularly adapted for use in connection with an aircraft wing fuel tank, an improved gasket designed for use in such an assembly, and an improved process for making such a gasket.

SUMMARY OF THE INVENTION

The panel assembly of the present invention is particularly adapted for closing an access opening in a wall of an aircraft, and more particularly for such a wall that forms a wing mounted fuel tank. The wall has a front side, a back side, and an edge portion defining said access opening.

The assembly comprises a panel member having a front face and a rear face, with the panel member being adapted to close the access opening. The panel member comprises a main central panel portion and a peripheral edge panel portion extending around the main central panel portion. The edge portion comprises an outer edge panel portion having a forwardly facing first outer edge panel surface portion adapted to engage a rearwardly facing second edge surface portion of the wall. The edge panel portion also comprises an inner edge panel portion positioned inwardly of the outer edge panel portion and having a front facing third inner edge panel surface portion.

There is a clamp ring having a front ring surface and a rear ring surface. The rear ring surface comprises an inner fourth rear ring surface portion adapted to be in bearing relationship with said third surface portion, and an outer fifth rear ring surface portion adapted to be in bearing engagement with a forward facing sixth edge surface portion of the wall. There is fastening means to urge the clamp ring in bearing relationship against the wall edge portion and the panel member.

There is a gasket having a generally annular configuration and adapted to be positioned between the third and fourth surface portions and also between the fifth and sixth surface portions. This gasket comprises:

1. a main central generally planar metallic electrically conductive wire mesh portion adapted to be impregnated with a lubricant and to be in metal to metal contact between the third and fourth surface portions and the fifth and sixth surface portions;

2. an inner edge seal portion connected to, and extending along, an inner edge of said wire mesh portion, and adapted to be in sealing engagement with said third and fourth surface portions at a location inwardly of said wire mesh portion; and 3. an outer edge seal portion connected to, and extending along, an outer edge of said wire mesh portion, and adapted to be in sealing engagement with said fifth and sixth surface portions at a location outwardly of said wire mesh portion.

With the panel assembly as described above, an electrically conductive path is maintained between the panel member and the wall, the lubricant is retained in the gasket, and corrosion is alleviated at the third, fourth, fifth and sixth surface portions.

In the preferred form, each of said seal portions has a connecting portion by which it is connected to the related edge of said wire mesh portion, with a connecting portion being impregnated in the related edge of the wire mesh portion. Further, each edge seal portion has a part thereof extending beyond the related edge of the wire mesh portion, and in the assembled position of the panel assembly the part extends beyond the back surface of the clamp ring.

Also, in the preferred form, the wire mesh portion has a plurality of hole perimeter portions defining a plurality of spaced holes to receive fastening members of said fastening means. Each hole perimeter portion has wire mesh elements thereof bonded to one another to form a relatively rigid hole perimeter portion. In the preferred form, the bonding is accomplished by welding the wire mesh elements to one another.

Also, the fastening means desirably comprises a plurality of fasteners which extend through the clamp ring and connect to the edge panel portion. The fasteners permit limited relative lateral movement between the clamp ring and the panel member and the edge surface portion of the wall. Thus, there is limited relative movement of said gasket and said panel member and said wall.

The invention further comprises the gasket itself, made in accordance with the recitation above.

Desirably, the wire mesh portion of the gasket is made with a plurality of longitudinally extending strands, with the density of these strands being at least as great as twelve strands per inch of width, and desirably between about twelve to fifteen strands per inch of width.

The method of the present invention is to make a gasket for a panel assembly such as that recited above. In this method, there is first provided a planar piece of wire mesh material that is formed in a generally annular configuration. Punch members are used to form a plurality of holes in the material at predetermined fastening locations along the circumferential length of the material.

Perimeter portions of the material (those portions that surround each of the holes) are clamped between welding elements. Then the mesh elements at the perimeter portions are welded to one another to form a relatively rigid perimeter portion that defines a related hole that is punched in the material.

Then the wire mesh material is located at a mold location by means of locating pins extending through the holes in the wire mesh material. The circumferential edge portions of the material are positioned in structure defining inner and outer perimeter mold cavities. A seal forming material is inserted into the inner and outer cavities, with the sealing material becoming impregnated in the edges of the wire mesh material. Then the seal forming material is hardened to form perimeter seal portions at the edges of the wire mesh material.

In the preferred form, the punching of the holes and the welding is accomplished by providing upper and lower molds, one of which has punch elements, and the other of which has punch receiving sockets. Welding elements surround the punch elements and the sockets.

Desirably, the seal portions are provided by placing the wire material between upper and lower mold members, one of which has locating pins, and the other of which has locating pin receiving sockets. The upper and lower mold portions are brought together to provide the circumferential cavities.

Other features of the invention will become apparent from the following detailed description.

DESCRIPTION OF THE PREFERRED EMBODIMENT

The panel assembly of the present invention in its preferred form incorporates the teachings of my co-pending application Ser. No. 567,843, filed Nov. 10, 1983, and entitled, "Unitary Access Panel for Aircraft Fuel Tanks". Accordingly, there will first be a brief description of the main components of the panel assembly shown in that patent application, after which the improvements of the present invention will be described in detail.

Figure 1:
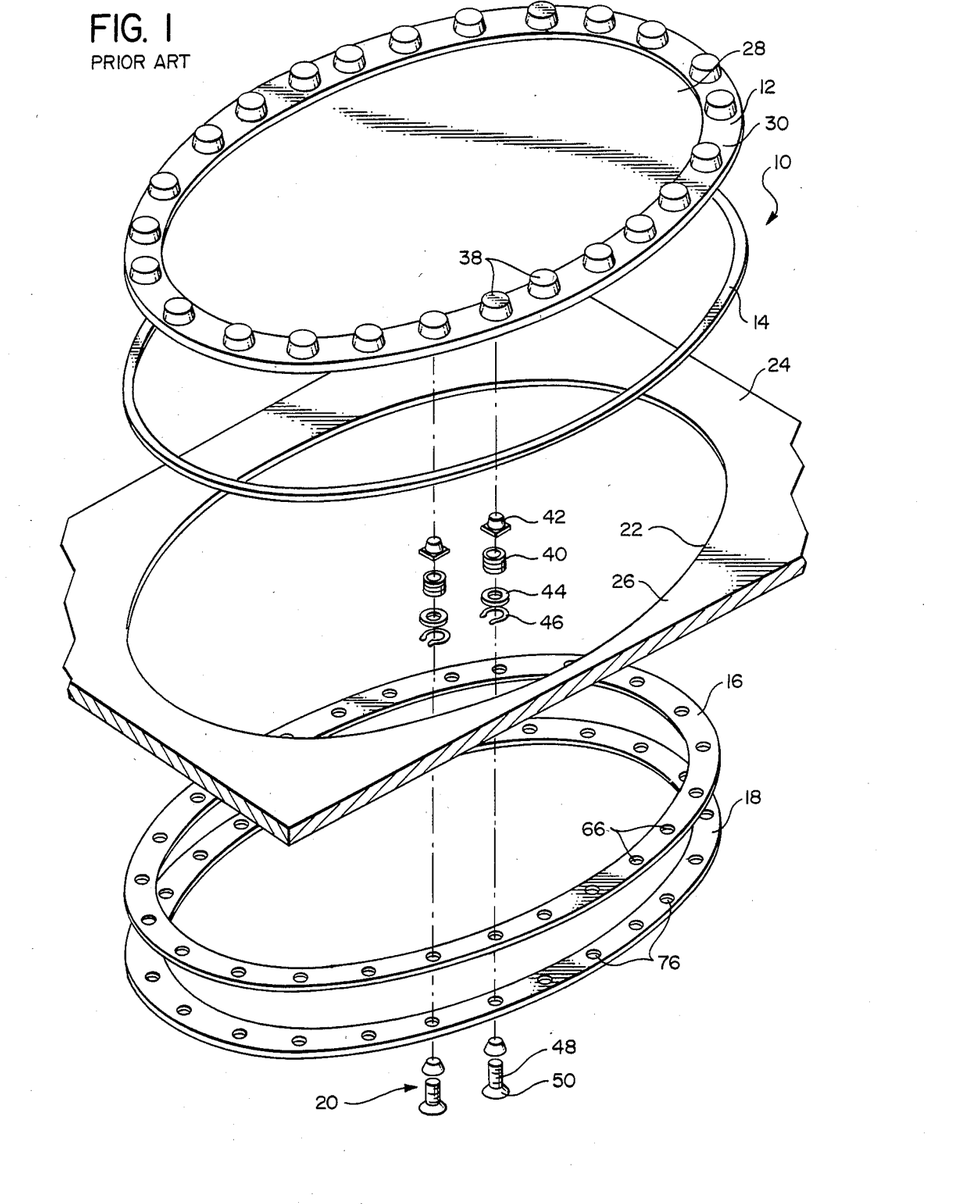
FIG. 1 is an isometric exploded view of a panel assembly described in my co-pending U.S. patent application, Ser. No. 567,843, filed Nov. 10, 1983, and entitled, "Unitary Access Panel, for Aircraft Fuel Tanks", with this panel assembly utilizing a gasket such as one previously known in the prior art.

In FIG. 1, there is shown in an exploded view a panel assembly 10, comprising an oval shaped main panel member 12, a perimeter fuel seal 14, an oval shaped gasket 16, a clamp ring 18, and a plurality of fasteners 20 (only two of which are shown for ease of illustration). This assembly 10 is designed to close an oval access opening 22 formed in a lower fuel tank wall 24. The edge portion 26 of the wall 24 that defines the opening 22 can also be considered as being part of the panel assembly 10, in that it cooperates with the components 12-20 in accomplishing the functions of the present invention.

Figure 2:
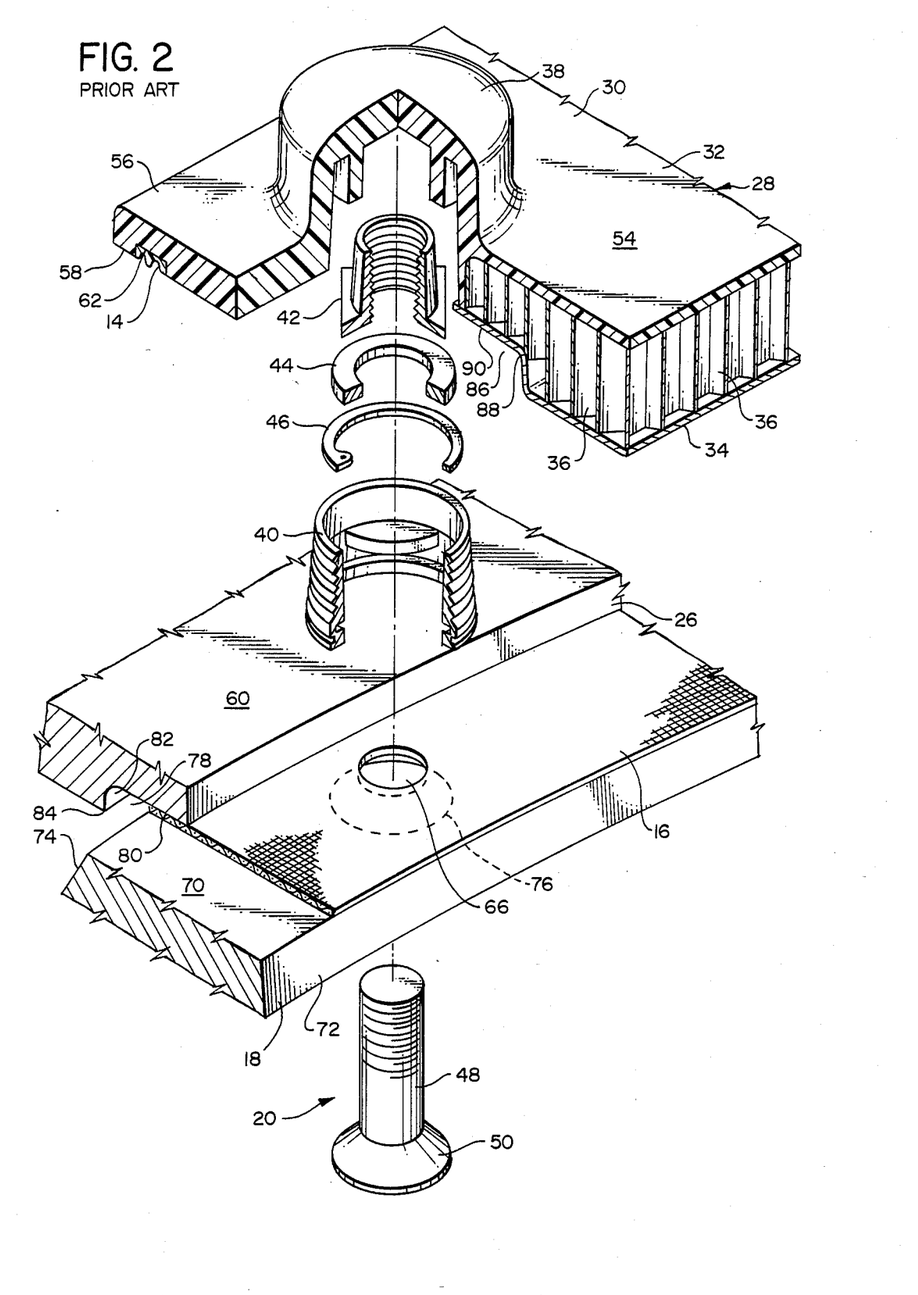
FIG. 2 is an exploded isometric view, with some of the components being shown fragmentarily, illustrating an edge portion of the panel assembly of FIG. 1.
Figure 3:
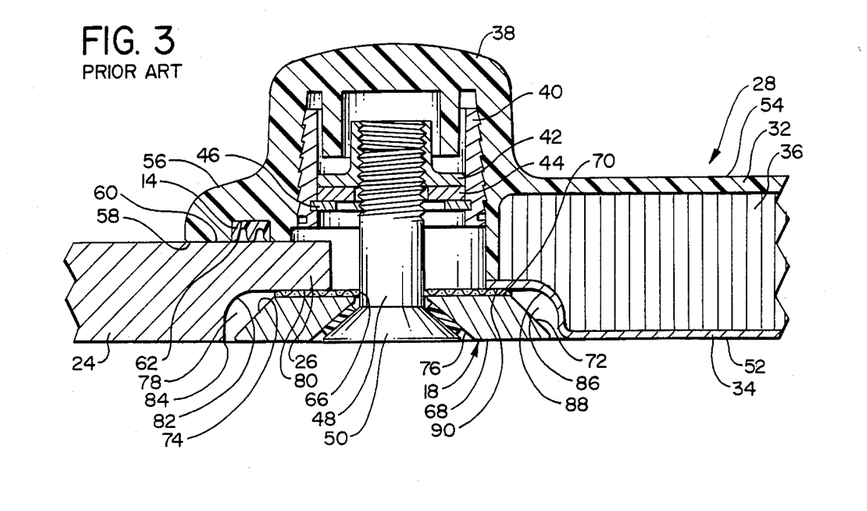
FIG. 3 is a sectional view taken perpendicular to a circuference line of the edge portion of the panel assembly at the location of one of the fasteners.

With reference being made now also to FIGS. 2 and 3, the panel member 12 comprises a main central panel portion 28 which substantially closes the access opening 22, and an edge panel portion 30. As shown herein, the central portion 28 has a sandwich structure and comprises an upper sheet or plate 32, made of a hard plastic, a lower metallic sheet 34, and an intermediate core of honeycomb structure, generally designated 36. The plastic material which forms the top plate 32 also forms the major portion of the edge portion 30, and is formed integrally therewith.

To describe the arrangement of the fasteners 20, the hard plastic edge portion 30 is formed at spaced locations with upwardly extending dome-like protrusions 38. Each of these dome-like protrusions 38 receives a sleeve-like insert 40 in which is positioned a nut 42. There is a washer 44 that fits against the nut, and the nut 42 and the washer 44 are held in place by a retaining ring 46. There is a bolt 48 having a tapered head 50.

While certain inventive features of the fasteners 20 (as well as other features described herein) are disclosed in my earlier co-pending application noted above, for the purposes of explaining the novel features of the present invention, the fasteners 20 are or may be of the configuration shown herein, but also may be similar to fasteners which are shown in the prior art. These fasteners 20 are so arranged that limited lateral movement is permitted relative to the components joined by the fasteners 20.

In further describing the panel assembly 10, the terms "front" or "forward" shall denote proximity to the plane occupied by the exterior surface 52 of the main central portion 28 of the panel member 12 (i.e. the exposed surface of the metal sheet 34), while the terms "rear" or "rearward" shall denote proximity to the plane occupied by the exposed surface 54 of the plate 32 (which surface 54 defines a portion of the containing surface for the fuel). The term "inner" shall denote proximity to a central portion of the main central portion 28 of the panel 12, while the term "outer" shall denote proximity to the edge portion 30 of the panel 12 or at least a direction extending away from the central part of the main panel portion 28 toward the opening edge portion 26 or panel edge portion 30.

The panel edge portion 30 comprises an outer edge portion 56 having a forward facing perimeter contact surface 58 which bears against a rearwardly facing surface portion 60 of the edge portion 26 of the wall 24. Further, the outer edge portion 56 is formed at the location of the contact surface 58 with a circumferential groove 62 which receives the aforementioned fuel seal member or ring 14 which provides a fuel seal between the contact surfaces 58 and 60.

To proceed further with a description of the gasket 16 and clamp ring 18, it should be pointed out that the particular configuration of the clamp ring 18 shown herein has, in and of itself, existed for a number of years in the prior art. Further, the particular configuration of the gasket 16 as shown in FIGS. 1, 2 and 3 has for a number of years, existed in the prior art. However, the gasket configuration illustrated in FIG. 4 and which is described further with reference to FIGS. 5-8 as to the method of making the same is a novel feature of the present invention and provides, in combination with the other elements described herein, a novel panel assembly.

With reference to FIGS. 1-3, the gasket 16 of the prior art configuration is made of a porous or foraminous metal fabric having a width dimension of about one inch and a thickest dimension of possibly 1/32 of an inch. In terms of density, the longitudinal woven strands (i.e. those elements in the metal fabric that run parallel to the circumference of the gasket 16) have a spacing distance such that there are approximately ten strands per inch width. The gasket 16 is formed with a plurality of holes 66 to receive the bolts 48.

The clamp ring 18 has a front surface 68, a back surface 70, an inner side surface 72, and an outer side surface 74. The two surfaces 68 and 70 are, in the final assembly, substantially parallel to the aforementioned panel surfaces 52 and 54. The two edge surfaces 72 and 74 are bevelled inwardly from a forward to rear direction. Also, the clamp ring 18 is formed with a plurality of countersunk holes 76 to receive the head 50 and shank of the bolt 48. The forward inner part of the wall edge portion 26 is recessed as at 78 to accommodate the outer portion of the clamp ring 18. This recess 78 is such that the wall edge portion 26 is formed with a forwardly facing bearing surface 80 that is generally parallel to the panel surfaces 52 and 54, and which is immediately adjacent to the access opening 22. At the outer edge of the bearing surface 80, the recess 78 is formed with a curved transition surface portion 82 that terminates at a corner 84 just outside of the outer edge of the front surface 68 of the clamp ring 18.

The inner part of the edge portion 30 of the panel 12 is formed with a recess 86 generally similar to the recess 78 in configuration. Thus, the metallic sheet 34 has a rearwardly and outwardly curved contoured surface 88 which then leads into an outwardly extending bearing surface 90. This bearing surface 90 is positioned just rearwardly of the inner surface portion of the rear surface 70 of the clamp ring 18.

With the panel assembly 10, as shown in FIGS. 1-3, in the assembled position of FIG. 3, the main central portion 28 of the panel member 12 is positioned in, and occupies the major portion of, the access opening 22. The outer edge portion 56 of the panel 12 is positioned immediately behind the edge portion 26 of the tank wall 24, with the bearing face 58 of the edge portion 56 pressing against the bearing face 60 of the wall edge portion 26. The peripheral seal 14 prevents leakage of fuel between the outer panel edge portion 56 and the wall 24.

The fasteners 20 simultaneously pull the panel 12 in sealing relationship against the fuel tank wall 24, and also press the clamp ring 18 against the gasket 16, which in turn presses against the bearing surface 80 of the wall edge portion 26, and also against the bearing surface 90 at the inner edge portion of the panel 12. Prior to installation of the assembly 10, the gasket 16 is saturated with, or impregnated with, a suitable lubricant, such as a grease of sufficient density so as to be able to be retained in the many openings within the mesh fabric of the gasket 16.

Since the wing structure in which the panel is mounted flexes with the moderate up and down movement of the wing, it is expected that there would be some small amount of relative movement between the panel member 12 and the fuel tank wall 24, which would in turn mean some relative movement between either or both of the panel member 12 and wall 24, relative to the clamp ring 18 and gasket 16. The purpose of the lubricant is primarily to alleviate as much as possible problems of abrasion between the relatively moving parts. One of the primary functions served by the gasket 16 is to accommodate the grease-like lubricant and provide an electrically conductive path between the metal sheet 34 and the metallic tank wall 24. Thus, it is essential that there be a reasonable degree of metal to metal contact between the gasket 16 and the wall 24 and the metal sheet 34. For this reason, even with the addition of the lubricant in the gasket 16, there will still be some degree of wear.

While the arrangement described above provides a generally satisfactory panel assembly, periodic maintenance is required, and it is necessary to replace the gaskets 16 with some regularity. The purpose of the present invention is to provide an improved panel assembly, and more particularly to improve the performance of the prior art gasket 16 relative to the overall panel assembly 10.

Figure 4:
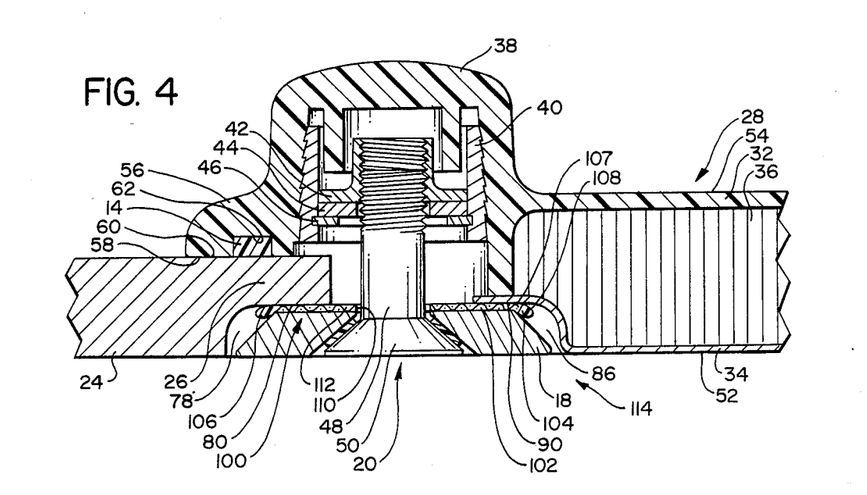
FIG. 4 is a sectional view similar to FIG. 3, but showing the assembly of the present invention with the improved gasket design.

The present invention will now be described with reference initially to FIG. 4, which is a view similar to FIG. 3. The main panel member 12, the fuel seal ring 14, the clamp ring 18, and the fasteners 20 are the same configuration as described with reference to FIGS. 1–3 above. Further, the configuration of the wall 24 and its edge portion 26 are the same as shown in FIG. 3. Accordingly, in the following description, the numerical designations of these components will remain the same. Since the gasket of the present invention is modified relative to the gasket 16 of FIGS. 1–3, different numerical designations will be applied to that gasket.

The gasket of the present invention is generally designated 100, and it comprises an electrically conductive main wire mesh fabric portion 102 which in overall configuration is the same as that of the gasket 16 described above. However, the spacing of the wire mesh elements has been reduced to between about twelve per linear inch to fifteen per linear inch. This greater density of metal fabric filaments improves the metal to metal contact area to insure that there is a proper electrically conductive path, and this will be discussed more fully later herein.

In addition, there are provided at the two edge portions of the fabric portion 102 inner and outer seal members 104 and 106, respectively. These seal members 104 and 106 are made of a suitable moderately yielding seal material, such as fluorosilicone synthetic rubber for use in contact with aviation fuel and other possibly corrosive fluids. Each seal member 104 and 106 has an inner securing portion 107 which is molded into engagement with the wire fabric at the related edge portion of the wire mesh fabric portion 102. Then each of the seal members 104 and 106 extends moderately outwardly from the outer edge of the fabric portion 102, as at 108.

The wire mesh fabric portion 102 of the gasket 100 is formed with a plurality of through openings 110 having the same diameter and positions as the holes 66 in the gasket 16 shown in FIGS. 1–3. However, the annular edge portion 112 that defines each of the openings 110 has the filaments of the wire fabric welded one to another to make the fabric in the edge portions 112 relatively rigid and relatively less compressible relative to lateral movement parallel to the plane occupied by the wire mesh fabric portion 102. Not only does this arrangement alleviate wear of the wire fabric, but it serves to locate the gasket 100 more precisely to improve the function of the edge seal members 104 and 106.

To describe the function of the gasket 100, reference is again made to FIG. 4. To distinguish the panel assembly of FIG. 4 from that illustrated in FIGS. 1–3, the panel assembly of FIG. 4 is generally designated 114. The overall functions of the components shown in FIG. 4 are generally the same as described in FIGS. 1–3 above. However, the operation of the gasket 100 relative to these components constitutes the major improvement in the present invention, and this will now be described.

Prior to installation of the gasket 100, the wire mesh fabric portion 102 is impregnated with a grease-like lubricant, as described above. The entire assembly 114 is put in place and secured as illustrated in FIG. 4 (and as previously described with reference to FIG. 3), and it will be noted that the inner portion 107 of the inner seal member 104 is positioned between the inner positioned edge surface portion of the back surface 70 of the clamp ring 18 and the adjacent portion of the bearing surface 90 of the panel 12. The outer portion 108 of the seal member 104 extends a short distance into the area defined by the inner positioned sloped surface 72 of the clamp ring 18 and the adjacent portion of the bearing surface 90.

As the various bolts 48 are tightened around the entire periphery of the panel assembly 114 by being threaded into their respective nuts 42, the force of the surfaces 70 and 90 compress the seal member 104 so as to provide a substantially watertight seal between the clamp ring 18 and the adjacent bearing surface 90. The outer seal member 106 performs substantially the same sealing function relative to the outer edge of the clamp ring 18 and the bearing surface 80 of the fuel tank wall 24. Since the positioning and function of the outer seal member 106 is substantially the same as that of the inner seal member 104, that description will not be repeated.

It has been found that the panel assembly 114 incorporating the gasket 100 as described above provides certain advantages over that described relative to those described in FIGS. 1–3. First, the seal members 104 and 106 improve retention of the grease lubricant in the wire mesh fabric 102. Further, it has been found that the presence of the seal members 104 and 106 provides improved resistance to wear and corrosion in the metal components in the area of the gasket 100. It is believed that this improved resistance to corrosion is due not only to the better retention of lubricant, but also to the prohibition of moisture entering between the clamp ring 18 and the wall edge portion 26 and the panel edge portion 30. Present analysis indicates that the presence of moisture, in conjunction with at least some amount of surface wear at those surface portions that come in contact with the gasket 100, is a problem which is uniquely be solved with the improved gasket 100. Further, it has been found that the presence of the seal members 104 and 106 still permits proper metal to metal contact through the gasket 100.

Figure 5:
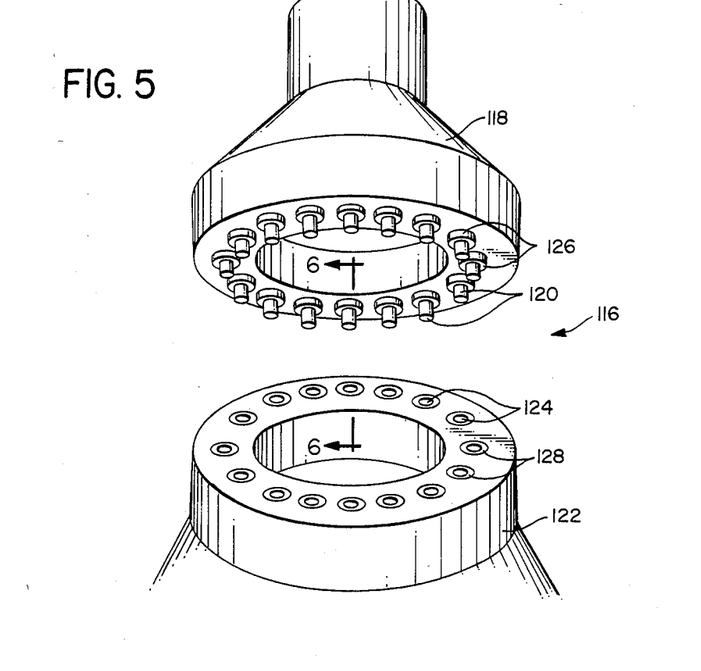
FIG. 5 is a perspective view of upper and lower parts of a manufacturing tool to form the fastener holes for the gasket made in accordance with the present invention.
Figure 6:
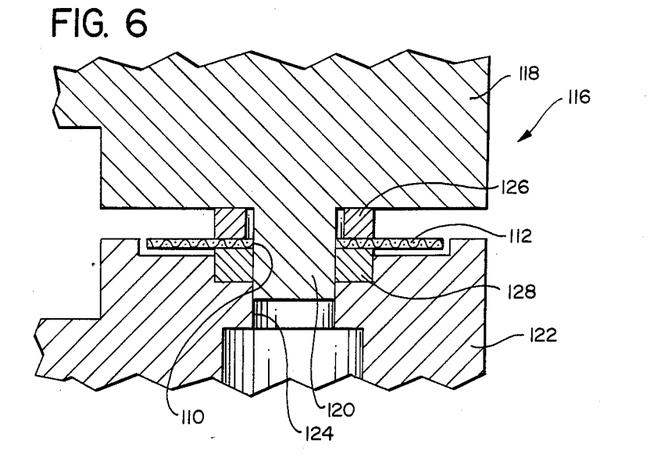
FIG. 6 is a sectional view taken along lines 6—6 of FIG. 5 and illustrating the hole forming components at one hole forming location.

To describe the method of making the gasket 100, reference is initially made to FIGS. 5 and 6. The first step is to form the openings in the wire mesh fabric portion 102.

In FIG. 5, there is shown semischematically a hole punching and welding apparatus, generally designated 116. There is an upper movable tool 118, having a plurality of generally cylindrical punching elements 120, and a lower tool 122 having a plurality of sockets 124 matching the punches 120. In addition, there is surrounding each punching element 120 an upper diffusion bonding element 126. In like manner, there is surrounding the location of each opening 124 a lower diffusion bonding element 128.

In operation, a blank piece of wire mesh fabric material, having the oval configuration and dimensions of the wire mesh fabric portion 102 is placed on the lower stationary tool 122 over the openings 124. Then the upper tool 118 is moved downwardly so that the punching elements 120 form the openings 110 in the wire mesh fabric. As the two tool members 118 and 122 close against one another, the diffusion bonding elements 126 and 128 are energized to heat the wire fabric surrounding the openings 110 so as to form the rigidized edge portions 112 that surround each of the openings 110.

Figure 7:
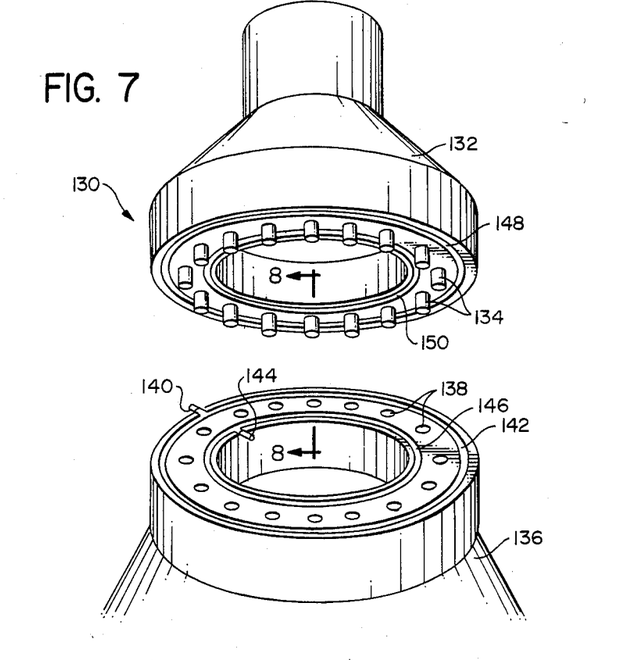
FIG. 7 is a perspective view of the upper and lower parts of a second tool utilized to form the seal edge portions of the gasket.
Figure 8:
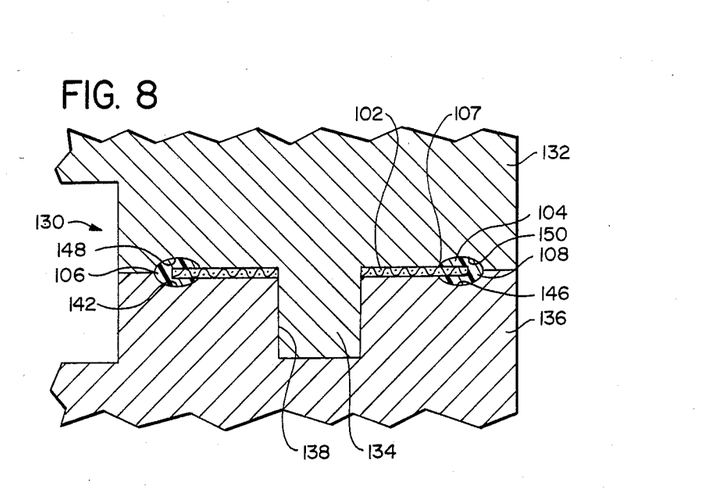
FIG. 8 is a sectional view taken along lines 8—8 in FIG. 7 and illustrating the edge seals formed in the gasket.

Not only does the hole forming process above serve the function of providing the openings 110 in the end product, but these openings also serve to properly locate the wire mesh fabric for the following operation, and to describe this, reference is now made to FIGS. 7 and 8.

In FIG. 7, there is shown a mold 130, comprising an upper molding tool 132 having a plurality of cylindrical locating elements 134 and a lower molding tool 136 having a plurality of sockets 138 to receive the locating elements 134. The lower molding element 136 has a feed tube 140 which leads into a first outer peripheral groove 142, and also a feed tube 144 which leads into an inner circumferential groove 146 formed in the upper molding tool 132. The grooves 142 and 146 have matching grooves 148 and 150 in the upper tool 132.

After the wire mesh fabric is formed with the holes 110, as described above relative to FIGS. 5 and 6, the fabric is placed between the upper and lower molds 132 and 136 respectively, and is located by means of the locating elements or pins 134. The two mold sections 132 and 136 are moved together so that the matching grooves 142 and 148 form one ring-like cavity, while the other grooves 146 and 150 form a second inner ring-like cavity. Then the material which is to make the seals 104 and 106 is injected through the feed tubes 140 and 144 to fill the two ring-like cavities 142/148 and 146/150. Since the seal material injected into the ring-like cavities is initially in a liquid state, the inner seal portions 107 become impregnated in the edge portions of the wire mesh, thus insuring that there is a proper bond.

After the seal material has hardened in the grooves 142/148 and 146/150, the mold sections 132 and 136 are opened, and the finished gasket 100 removed therefrom. The gasket 100 so formed can then be utilized in the panel assembly of the present invention in the manner illustrated in FIG. 4.

It is apparent that various modifications could be made to the present invention, without departing from the teachings thereof.

I claim:

1. A panel assembly particularly adapted for closing an access opening in a wall of an aircraft, where the wall has a front side, a back side, and an edge portion defining said access opening, said assembly comprising:
    a. a panel member having a front face and a rear face, and adapted to close said access opening, said panel member comprising a main central panel portion and a peripheral edge panel portion extending around the main central panel portion;
    b. said edge panel portion comprising an outer edge panel portion having a forward facing first outer edge panel surface portion adapted to engage a rearward facing second edge surface portion of said wall;
    c. said edge panel portion comprising an inner edge panel portion positioned inwardly of said outer edge panel portion and having a front facing third inner edge panel surface portion;
    d. a clamp ring having a front ring surface and a rear ring surface, said rear ring surface comprising an inner fourth rear ring surface portion adapted to be in bearing relationship with said third surface portion, and an outer fifth rear ring surface portion adapted to be in bearing engagement with a forward facing sixth edge surface portion of said wall;
    e. fastening means to urge said clamp ring in bearing relationship against said wall edge portion and said panel member;
    f. a gasket having a generally annular configuration and adapted to be positioned between said third and fourth surface portions and also between said fifth and sixth surface portions, said gasket comprising:
        1. a main central generally planar metallic electrically conductive wire mesh portion adapted to be impregnated with a lubricant and to be in metal to metal contact between the third and fourth surface portions and the fifth and sixth surface portions;
        2. an inner edge seal portion connected to, and extending along, an inner edge of said wire mesh portion, and adapted to be in sealing engagement with said third and fourth surface portions at a location inwardly of said wire mesh portion;
        3. an outer edge seal portion connected to, and extending along, an outer edge of said wire mesh portion, and adapted to be in sealing engagement with said fifth and sixth surface portions at a location outwardly of said wire mesh portion;

whereby an electrically conductive path is maintained between said panel member and said wall, the lubricant is retained in the gasket, and corrosion is alleviated at the third, fourth, fifth and sixth surface portion.

2. The panel assembly as recited in claim 1, wherein each of said seal portions has a connecting portion by which it is connected to the related edge of said wire mesh portion, with the connecting portion being impregnated in the related edge of the wire mesh portion.

3. The panel assembly as recited in claim 2, wherein each edge seal portion has a part thereof extending beyond the related edge of the wire mesh portion, and in the assembled position of the panel assembly said part extends beyond the back surface of the clamp ring.

4. The panel assembly as recited in claim 1, wherein each edge seal portion has a part thereof extending beyond the related edge of the wire mesh portion, and in the assembled position of the panel assembly said part extends beyond the back surface of the clamp ring.

5. The panel assembly as recited in claim 1, wherein said wire mesh portion has a plurality of hole perimeter portions defining a plurality of spaced holes to receive fastening members of said fastening means, each hole perimeter portion having wire mesh elements thereof bonded one to another to form a relatively rigid hole perimeter portion.

6. The panel assembly as recited in claim 5, wherein said hole perimeter portions have their wire mesh elements welded to one another.

7. The panel assembly as recited in claim 1, wherein:
    a. each of said seal portions has a connecting portion by which it is connected to the related edge of said wire mesh portion, with the connecting portion being impregnated in the related edge of the wire mesh portion;
    b. said wire mesh portion has a plurality of hole perimeter portions defining a plurality of spaced holes to receive fastening members of said fastening means, each hole perimeter portion having wire mesh elements thereof bonded one to another to form a relatively rigid hole perimeter portion;
    c. said hole perimeter portions have their wire mesh elements welded to one another.

8. The panel assembly as recited in claim 1, wherein said fastening means comprises a plurality of fasteners which extend through said clamp ring and connect to said edge panel portion, said fasteners permitting limited relative lateral movement between said clamp ring, said gasket and said panel member, and said edge surface portion of the wall, whereby there is limited relative movement of said gasket and said panel member and said wall.

9. The panel assembly as recited in claim 1, wherein the wall of the aircraft is a wall of a wing mounted fuel tank, and said panel assembly is further characterized as follows:
  a. each of said seal portions has a connecting portion by which it is connected to the related edge of said wire mesh portion, with the connecting portion being impregnated in the related edge of the wire mesh portion;
  b. each edge seal portion has a part thereof extending beyond the related edge of the wire mesh portion, and in the assembled position of the panel assembly said part extends beyond the back surface of the clamp ring;
  c. said wire mesh portion has a plurality of hole perimeter portions defining a plurality of spaced holes to receive fastening members of said fastening means, each hole perimeter portion having wire mesh elements thereof bonded one to another to form a relatively rigid hole perimeter portion;
  d. said hole perimeter portions have their wire mesh elements welded to one another;
  e. said fastening means comprises a plurality of fasteners which extend through said clamp ring and connect to said edge panel portion, said fasteners permitting limited relative lateral movement between said clamp ring, said gasket and said panel member, and said edge surface portion of the wall, whereby there is limited relative movement of said gasket and said panel member and said wall.

10. A gasket for a panel assembly particularly adapted for closing an access opening in a wall of an aircraft, where the wall has a front side, a back side, and an edge portion defining said access opening, and where said assembly comprises:
  a. a panel member having a front face and a rear face, and adapted to close said access opening, said panel member comprising a main central panel portion and a peripheral edge panel portion extending around the main central panel portion;
  b. said edge panel portion comprising an outer edge panel portion having a forward facing first outer edge panel surface portion adapted to engage a rearward facing second edge surface portion of said wall;
  c. said edge panel portion comprising an inner edge panel portion positioned inwardly of said outer edge panel portion and having a front facing third inner edge panel surface portion;
  d. a clamp ring having a front ring surface and a rear ring surface, said rear ring surface comprising an inner fourth rear ring surface portion adapted to be in bearing relationship with said third surface portion, and an outer fifth rear ring surface portion adapted to be in bearing engagement with a forward facing sixth edge surface portion of said wall;
  e. fastening means to urge said clamp ring in bearing relationship against said wall edge portion and said panel member;
said gasket having a generally annular configuration and adapted to be positioned between said third and fourth surface portions and also between said fifth and sixth surface portions, said gasket comprising:
  a. a main central generally planar metallic electrically conductive wire mesh portion adapted to be impregnated with a lubricant and to be in metal to metal contact between the third and fourth surface portions and the fifth and sixth surface portions;
  b. an inner edge seal portion connected to, and extending along, an inner edge of said wire mesh portion, and adapted to be in sealing engagement with said third and fourth surface portions at a location inwardly of said wire mesh portion;
  c. an outer edge seal portion connected to, and extending along, an outer edge of said wire mesh portion, and adapted to be in sealing engagement with said fifth and sixth surface portions at a location outwardly of said wire mesh portion;
whereby, when said gasket is in place in said panel assembly, an electrically conductive path is maintained between said panel member and said wall, the lubricant is retained in the gasket, and corrosion is alleviated at the third, fourth, fifth and sixth surface portion.

11. The gasket as recited in claim 10, wherein each of said seal portions has a connecting portion by which it is connected to the related edge of said wire mesh portion, with the connecting portion being impregnated in the related edge of the wire mesh portion.

12. The gasket as recited, in claim 11, wherein each edge seal portion has a part thereof extending beyond the related edge of the wire mesh portion, and in the assembled position of the panel assembly said part extends beyond the back surface of the clamp ring.

13. The gasket as recited in claim 10, wherein each edge seal portion has a part thereof extending beyond the related edge of the wire mesh portion, and in the assembled position of the panel assembly said part extends beyond the back surface of the clamp ring.

14. The gasket as recited in claim 10, wherein said wire mesh portion has a plurality of hole perimeter portions defining a plurality of spaced holes to receive fastening members of said fastening means, each hole perimeter portion having wire mesh elements thereof bonded one to another to form a relatively rigid hole perimeter portion.

15. The gasket as recited in claim 14, wherein said hole perimeter portions have their wire mesh elements welded to one another.

16. The gasket as recited in claim 10, wherein:
  a. each of said seal port has a connecting portion by which it is connected to the related edge of said wire mesh portion, with the connecting portion being impregnated in the related edge of the wire mesh portion;
  b. said wire mesh portion has a plurality of hole perimeter portions defining a plurality of spaced holes to receive fastening members of said fastening means, each hole perimeter portion having wire mesh elements thereof bonded one to another to form a relatively rigid hole perimeter portion;
  c. said hole perimeter portions have their wire mesh elements welded to one another.

17. The gasket as recited in claim 1, wherein the wall of the aircraft is a wall of a wing mounted fuel tank, and said panel assembly is further characterized as follows:
  a. each of said seal portions has a connecting portion by which it is connected to the related edge of said wire mesh portion, with the connecting portion being impregnated in the related edge of the wire mesh portion;
  b. each edge seal portion has a part thereof extending beyond the related edge of the wire mesh portion, and in the assembled position of the panel assembly said part extends beyond the back surface of the clamp ring;
  c. said wire mesh portion has a plurality of hole perimeter portions defining a plurality of spaced holes to receive fastening members of said fastening means, each hole perimeter portion having wire mesh elements thereof bonded one to another to form a relatively rigid hole perimeter portion;

d. said hole perimeter portions have their wire mesh elements welded to one another;

e. said fastening means comprises a plurality of fasteners which extend through said clamp ring and connect to said edge panel portion, said fasteners permitting limited relative lateral movement between said clamp ring, said gasket and said panel member, and said edge surface portion of the wall, whereby there is limited relative movement of said gasket and said panel member and said wall.

18. The gasket as recited in claim 10, wherein said wire mesh portion comprises a plurality of parallel strands extending along a circumferential lengthwise axis of said wire mesh portion, said strands having a spacing such that there are at least twelve strands per inch width of said gasket.

19. The gasket as recited in claim 18, wherein the strands per inch of width are between twelve and fifteen strands.

20. A method of making a gasket for a panel assembly particularly adapted for closing an access opening in a wall of an aircraft, where the wall has a front side, a back side, and an edge portion defining said access opening, said assembly comprising:

a. a panel member having a front face and a rear face, and adapted to close said access opening, said panel member comprising a main central panel portion and a peripheral edge panel portion extending around the main central panel portion;

b. said edge panel portion comprising an outer edge panel portion having a forward facing first outer edge panel surface portion adapted to engage a rearward facing second edge surface portion of said wall;

c. said edge panel portion comprising an inner edge panel portion positioned inwardly of said outer edge panel portion and having a front facing third inner edge panel surface portion;

d. a clamp ring having a front ring surface and a rear ring surface, said rear ring surface comprising an inner fourth rear ring surface portion adapted to be in bearing relationship with said third surface portion, and an outer fifth rear ring surface portion adapted to be in bearing engagement with a forward facing sixth edge surface portion of said wall;

e. fastening means to urge said clamp ring in bearing relationship against said wall edge portion and said panel member;

f. a gasket having a generally annular configuration and adapted to be positioned between said third and fourth surface portions and also between said fifth and sixth surface portions, said gasket comprising:

1. a main central generally planar metallic electrically conductive wire mesh portion adapted to be impregnated with a lubricant and to be in metal to metal contact between the third and fourth surface portions and the fifth and sixth surface portions;

2. an inner edge seal portion connected to, and extending along, an inner edge of said wire mesh portion, and adapted to be in sealing engagement with said third and fourth surface portions at a location inwardly of said wire mesh portion;

3. an outer edge seal portion connected to, and extending along, an outer edge of said wire mesh portion, and adapted to be in sealing engagement with said fifth and sixth surface portions at a location outwardly of said wire mesh portion;

said method comprising:

a. providing a planar piece of wire mesh material formed in a generally annular configuration;

b. utilizing punch members to punch a plurality of holes in said material at predetermined fastening locations along a circumferential length of said material;

c. clamping perimeter portions of the material that surrounds each of said holes between welding elements and welding mesh elements of said perimeter portions one to another to form relatively rigid perimeter portions that define the holes punched in the material;

d. locating the wire mesh material at a mold location by means of locating pins extending through the holes in the wire mesh material, with circumferential edge portions of said material being positioned in structure defining inner and outer perimeter mold cavities;

e. inserting a seal forming material into said inner and outer cavities, with said sealing material becoming impregnated in the edges of the wire mesh material;

f. causing the seal forming material to harden, to form perimeter seal portions at the edges of the wire mesh material.

21. The method as recited in claim 20, wherein said punching and said welding is accomplished by providing upper and lower molds, one of which has punch elements and the other of which has punch receiving sockets, and with welding elements surrounding said punch elements and said sockets.

22. The method as recited in claim 20, wherein said seal portions are provided by placing the wire material between upper and lower mold members, one of which has locating pins, and the other of which has locating pin receiving sockets, and said upper and lower mold portions are brought together to provide said circumferential cavities.

* * * * *